Figure 1:
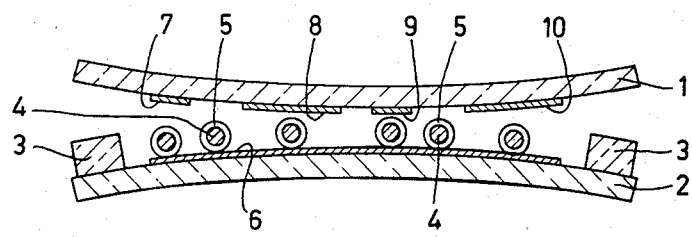

United States Patent [19]

Spruijt

[11] 4,249,800
[45] Feb. 10, 1981

[54] DISPLAY DEVICE

[75] Inventor: Aloysius M. J. M. Spruijt, Eindhoven, Netherlands

[73] Assignee: U.S. Philips Corporation, New York, N.Y.

[21] Appl. No.: 966,454

[22] Filed: Dec. 4, 1978

[30] Foreign Application Priority Data

Dec. 22, 1977 [NL] Netherlands ......................... 7714232

[51] Int. Cl.³ .............................................. G02F 1/133
[52] U.S. Cl. ..................................... 350/320; 350/344
[58] Field of Search ................ 350/343, 344, 357, 320

[56] References Cited

U.S. PATENT DOCUMENTS

| 3,661,444 | 5/1972 | Matthies | 350/343 |
| 4,050,786 | 9/1977 | Feldman | 350/344 |
| 4,165,157 | 8/1979 | Kobale et al. | 350/344 X |

*Primary Examiner*—Edward S. Bauer

[57] ABSTRACT

In a display device having a liquid display medium, for example liquid crystal, the support plates must be kept accurately spaced apart. This is done by means of a monolayer of grains having a hard core and a thermoplastic envelope.

2 Claims, 2 Drawing Figures

U.S. Patent   Feb. 10, 1981   4,249,800

DISPLAY DEVICE

The invention relates to a display device comprising a liquid display medium between two support plates which are kept spaced apart by a layer of grains having a thickness of one grain.

Such a device may be used to display alphanumeric or visual information and the liquid display medium consists, for example, of liquid crystal or of a solution of an electrochromic material.

A device of the kind mentioned in the first paragraph is disclosed in German Offenlegungsschrift No. 2,159,165. In this known device having a liquid crystal, grains are used to keep the plates spaced apart, the grains softening and being slightly flattened between the support plates, or grains are used which do not soften and are so hard that they can partly penetrate into the surface of the support plates.

It is the object of the invention to provide such means for keeping the plates spaced apart that the distance between the plates is accurately determined. A further object of the invention is to avoid comparatively high temperatures upon sealing the display device. Another object of the invention is to provide such means for keeping the support plates spaced apart that the plates can be thin and need not be necessarily entirely flat.

According to the invention, a display device of the kind mentioned in the first paragraph is characterized in that the grains consist of a spherical core of a hard material having a diameter which is equal to the distance between the support plates and which is enveloped by a layer of thermoplastic material.

In a device according to the invention the distance between the support plates is determined by the spherical core of the grains. The grains are kept in their places by their thermoplastic envelope which is slightly softened and squeezed upon sealing the device.

The core of the grains preferably is glass. Glass grains having an accurately determined diameter of the order of magnitude of 10 microns can be manufactured in a simple manner.

A very suitable thermoplastic material for the envelope of the grains is polyethylene.

Figure 2:
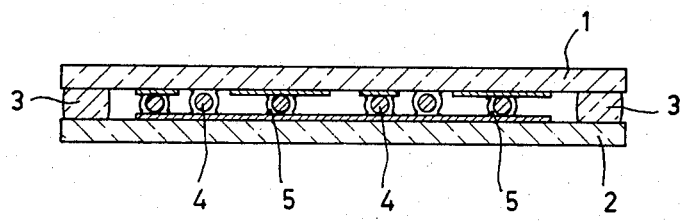

The invention will be described in greater detail with reference to the accompanying drawing, of which FIG. 1 shows the main components of a device according to the invention in their mutual positions right before sealing, and FIG. 2 shows a device according to the invention after sealing.

FIG. 1 shows the major components of a device according to the invention, namely glass support plates 1 and 2, a polyethylene frame 3 for the sealing of the edge of the device, and glass balls 4 having an envelope 5 of polyethylene. The support plates 1 and 2 are provided in known manner with electrodes for controlling the device, namely the electrodes 7, 8, 9 and 10 on the plate 1 and the counter electrode 6 on the plate 2.

As is shown, the plates 1 and 2 are not entirely flat. Commercially available glass plates often show an unflatness of, for example, a few microns over 10 cm. Such slightly convex glass plates are assembled according to one of the aspects of the invention with their convex sides facing each other. Upon sealing the plates are pressed against each other. The glass balls 4 then determine the distance between the plates throughout the surface. The sealing is carried out by fusing the plates 1 and 2 at a temperature of 160° C. with the polyethylene frame 3.

FIG. 2 shows the device after sealing. After the sealing, the device may be filled, via a filling aperture not shown, with a liquid display medium, for example a liquid crystal which shows the electrooptical field effect (twisted nematic field effect) or the effect of the so-called dynamic scattering. Other liquid display media are, for example, a solution of an electrochromic material which discolors upon current passage and deposits on the energized electrodes, or a suspension of a colored pigment which may be deposited electrophoretically on the electrodes.

In a given case in which the twister effect was used, the distance between the support plates is 12 microns. For this purpose, glass balls are used which have a diameter of 12 microns and are provided with a layer of polyethylene in a thickness of a few tenths of a micron.

Glass balls having such small accurately determined diameters can be manufactured in known manner by selecting glass powder particles on mass (by centrifuging) and then blowing through a hot flame in which they melt and assume the spherical shape, and receiving the solidified particles.

The balls are provided with a layer by suspending them in a melted quantity of the coating material which is provided on a rotating disk. The balls which fly off the disk as a result of the centrifugal force are then provided with a skin which solidifies immediately.

The encapsulated balls are provided on the plate 2, for example, by silk screening, in which an emulsion is made of the encapsulated balls in water with a surface-active material. The balls may alternatively be provided by means of photosensitive lacquer, for example, polyvinyl alcohol made photosensitive with ammonium bichromate, or one of the known photolacquers which are used to manufacture printed circuits, in which the balls are suspended. After exposure through a mask and developing, grains are present only in the desired places.

In a given case the number of balls is 50 to 100 in an area of a few tenths of a millimeter in square and the distance between the areas is approximately 1 cm.

The balls may alternatively consist of a synthetic resin having a softening point which is higher than that of the envelope. For example, the core may then consist of polyethyleneterephtlhalate(commercially known by the trade name "Mylar" of Dupont, softening point approximately 250°) and the envelope of polyethylene (softening point 120° C.).

What is claimed is:

1. A method of making a display device with two support plates spaced apart by grains of a hard material having uniform diameters enveloped by a thermoplastic envelope comprising the steps of suspending the grains in a photosensitive lacquer on one of the plates, exposing the photosensistive lacquer to radiation through a patterned mask, developing the exposed photosensitive lacquer, whereby the grains are present only in the locations corresponding to the pattern of the mask, and pressing the plates together with the grains therebetween while raising the temperature of the thermoplastic envelopes to a temperature sufficiently to soften the same.

2. A method as recited in claim 1, wherein the photosensitive lacquer is polyvinyl alcohol made photosensitive with ammonium bichromate.

* * * * *